United States Patent [19]

Stewart et al.

[11] 4,444,285
[45] Apr. 24, 1984

[54] ELECTRO-MECHANICAL PROPULSION SYSTEM

[76] Inventors: Charles F. Stewart, P.O. Box 7166, Huntington Beach, Calif. 92615; Jack K. Stewart, P.O. Box 2281, Deming, N. Mex. 88030

[21] Appl. No.: 288,538

[22] Filed: Jul. 30, 1981

[51] Int. Cl.³ .............................................. B60K 1/00
[52] U.S. Cl. ..................................... 180/65.4; 290/45
[58] Field of Search .................. 180/65.4, 65 C, 65 R; 318/148, 803, 806, 807, 809, 810, 811; 290/45

[56] References Cited

U.S. PATENT DOCUMENTS

| 752,689 | 2/1904 | Krieger | 290/10 |
|---|---|---|---|
| 786,376 | 4/1905 | Nilson | 290/17 |
| 1,387,076 | 8/1921 | Shawhan | 290/11 |
| 1,598,268 | 8/1926 | De Coninck | 180/65 C |
| 2,581,596 | 1/1952 | Nims | 180/65 R |
| 3,205,966 | 9/1965 | Landers | 180/65 C |
| 3,527,990 | 9/1970 | Gasser | 318/807 |
| 3,551,685 | 12/1970 | Corry | 290/14 |
| 3,588,650 | 6/1971 | Bevis | 318/810 |
| 3,659,672 | 5/1972 | Jacobus | 180/65 R |
| 3,792,327 | 2/1974 | Waldorf | 318/139 |
| 3,888,325 | 6/1975 | Reinbeck | 180/65 A |
| 3,894,605 | 7/1975 | Salvadorini | 180/65 R |
| 4,054,818 | 10/1977 | Risberg | 318/807 |
| 4,113,045 | 9/1978 | Downing, Jr. | 180/65 C |
| 4,119,861 | 10/1978 | Gocho | 180/65 C |
| 4,119,862 | 10/1978 | Gocho | 290/17 |
| 4,315,305 | 2/1982 | Siemon | 318/809 |
| 4,334,182 | 6/1982 | Landino | 318/803 |

OTHER PUBLICATIONS

"New–Compact Accuspede Drive", *Borg-Warner Controls*, Mar. 29, 1966.

*Primary Examiner*—David M. Mitchell
*Assistant Examiner*—Joseph McCarthy
*Attorney, Agent, or Firm*—Ralph C. Grove

[57] ABSTRACT

An Electro-Mechanical Propulsion System for vehicles, wherein the prime mover 10, such as an internal combustion engine, drives an alternating voltage generator 20 through a first shaft 30 at a constant RPM controlled by a speed governor 40; and wherein the alternating voltage generator 20 serves as a source of energy for an electrical energy conversion unit comprising a controlled rectifier 50, a polyphase signal generator 100, an analog control unit 150, and a regulated DC power supply 140, to further provide a variable power and frequency source for an AC traction motor 60 coupled through a second shaft 70 to the vehicle wheel drive system 80. Operator manual or pedal control of the system is further provided by a speed control potentiometer 110, an acceleration control potentiometer 120, and a torque control potentiometer 130.

14 Claims, 7 Drawing Figures

ELECTRO-MECHANICAL PROPULSION SYSTEM

TECHNICAL FIELD

This invention pertains to shaft-driven propulsion systems for vehicles and more particularly to an electromechanical propulsion system wherein the prime mover such as an internal combustion engine drives an alternating voltage generator at a constant RPM and where the alternating voltage generator serves as a source of energy for an electric energy conversion unit that converts the energy source into a variable power, variable frequency source for a brushless AC propulsion motor for the vehicle.

BACKGROUND ART

It is known in the art of electric drives for vehicles to provide electric drive systems which comprise a prime mover, a generator coupled to the prime mover and a traction motor connected to a driving wheel which receives power from the generator. Typical systems of this type generally fall into one of four categories: (a) the output voltage of the generator is rectified to direct current and then applied to a type of DC traction motor; (b) a hybrid system is utilized where the output voltage of the generator is rectified to obtain direct current for charging a battery, and the combination is then applied to a type of DC traction motor; (c) the output voltage of the generator is connected to a power-frequency AC energy source and then applied to a type of AC traction motor; and (d) in another hybrid system, the output voltage of the generator is rectified to obtain direct current for charging a battery, and a variable frequency inverter is used to convert the DC power into alternating current which is used to energize an AC traction motor that drives the vehicle.

One of the primary considerations in the designs of the above present-day automotive drive systems is the achievement of a fuel-efficient, low-contaminant drive source for automotive vehicles. The fuel efficiency of an internal combustion engine stays high only when operated at a constant speed and under constant load. It is known that when an ordinary motor car runs through a city area, the fuel efficiency drops to about one-third of the best value because it is necessary to frequently stop and start the car or to operate the engine under load and no-load conditions.

While systems of the types listed in the four categories above strive to meet the fuel efficiency demands that present restricted fuel supply conditions dictate, each system has certain drawbacks that frustrate the attainment of their efficiency goals.

A problem inherent in the use of DC motors such as those used in categories (a) and (b) are that these are bulky, heavy, and expensive in comparison to three-phase AC induction motors. An additional advantage of the AC motor is that no brush-commutator system is required.

The system of category (c), while not maintaining the prime mover and alternator at a constant RPM, rather controls the speed of the prime mover so as to be near-optimum for a manual throttle setting. A problem inherent in the design however, is that the prime mover RPM must be maintained at least 2.5 times the speed of the AC traction motor to prevent a malfunction in the power converter section of the system.

Inherent in the systems (b) and (d) employing a hybrid combination of a prime mover, generator, rectifier, and battery is that both energy sources (generator and battery) must be capable of supplying maximum energy to the traction motor. Even though in both cases, the prime mover and generator are operated at a constant RPM to minimize fuel consumption, the additional weight of the battery necessary to provide reasonable speed and driving range requires the provision of additional available energy from the two sources.

Solutions to the above listed problems are presented in the DISCLOSURE OF INVENTION section.

The prior art searched did not disclose any patents or publications that were directly related to an electromechanical propulsion system of the type disclosed herein. However, the following U.S. patents were considered in the investigation and evaluation of the prior art relative to the existing apparatus used with the invention:

| U.S. PAT. NO. | INVENTOR | ISSUED |
| --- | --- | --- |
| 3,551,685 | Corry | 12/29/70 |
| 3,792,327 | Waldorf | 2/12/74 |
| 4,113,045 | Downing | 9/12/78 |
| 4,119,861 | Gocho | 10/10/78 |

The Corry Patent describes a motive power system for a vehicle comprising an engine-driven alternating current generator coupled to an AC electric drive motor through a power converter. The engine for driving the generator is an internal combustion engine and a control system is provided for operating the engine at near optimum fuel consumption over varying speeds of the engine.

The Waldorf Patent describes a vehicle electric drive including a DC traction motor powered by a prime mover-AC generator-rectifier-battery combination in which the traction motor is operated by the battery until the battery voltage drops to a level low enough to cause start-up of the prime mover-generator combination, thereby providing additional power for charging the battery and driving the traction motor.

The Downing Patent describes an all-electric AC tractor in which a prime mover operating at a constant speed is coupled to a three-phase alternator which, in turn, drives AC wheel motors through a cyclo-converter.

The Gocho Patent describes a starting aparatus for a gas turbine-generator mounted on an electric motor-driven vehicle. The electric motor vehicle is a hybrid type wherein the AC generator is DC-rectified and serves to charge a battery. The DC voltage is applied to an AC inverter which serves to drive AC wheel motors. The inverter drive frequency is controlled by a driver foot pedal.

DISCLOSURE OF THE INVENTION

The Electro-Mechanical Propulsion System is a shaft-driven propulsion system for a vehicle. A prime mover, which is generally an internal combustion engine operating at a constant RPM, acts as a thermo-mechanical energy source for an AC voltage generator operating to provide a constant-voltage, constant-frequency source for an electric energy conversion unit. The electrical energy conversion unit converts the constant frequency-constant voltage signal into a variable frequency-variable voltage polyphase AC source for an AC traction motor coupled to the vehicle wheel drive system.

To better understand the design features of the invention, it is well to briefly review some basic principles of AC induction motor operation.

It is known in the art of variable frequency AC induction motor design that the maximum torque will be produced in an AC induction motor when the rotor frequency lags the frequency of the AC excitation signals such that their ratio is that of the rotor resistance to the rotor reactance.

This change in the slip ratio (rotor freqency/input frequency) to produce maximum torque as the drive frequency changes results in a change in input impedance to the polyphase motor windings such that the input impedance is approximately proportional to input frequency. Furthermore, this maximum value of torque is achievable over the full range of input drive frequencies at a constant AC input current. To achieve this, applied voltage of the drive signals must be increased linearly with frequency in order to produce a linear increase in motor horsepower (and constant torque) as input drive frequency is increased.

The novel feature of the invention is its ability to deliver a constant torque over the full drive motor speed range, while maintaining a very minimal consumption of fuel by the prime mover. This novel feature is made possible by the functioning of the electrical energy conversion unit. This unit comprises a controlled DC rectifier that generates a DC voltage level proportional to the position of the vehicle operator's manual or pedal speed control; an analog control unit that converts the vehicle operator's manual or pedal speed control into the required DC voltage level and motor drive frequency control signal; a polyphase AC signal generator that converts the DC voltage level and frequency control signal into a polyphase AC variable frequency source for an AC traction motor whose shaft rotational rate is also proportional to the position of the operator's manual or pedal speed control.

Since both voltage and frequency of the generated AC driving source for the AC traction motor are linearly proportional to engine speed, a constant torque will be produced by the AC motor rotor shaft as the motor speed is varied. The fuel-saving feature of this invention results from the relaxation of power demand requirements placed upon the prime mover-generator combination. Only the rectified current needed to satisfy the torque requirements of the AC traction motor (less rectifier and electronic switch losses) need be supplied by the prime mover-generator combination. The prime mover RPM and generator voltage are maintained essentially constant over all operating conditions of the drive system.

The solutions to the problems inherent in the current apparatus listed in the BACKGROUND ART section will now be addressed:

(a) The use of an AC traction motor, generally an induction three-phase motor, overcomes the problems inherent in utilizing bulkier, heavier, and more expensive DC traction motors.

(b) The advantages to fuel economy in maintaining the prime mover/AC generator combination at a constant RPM have already been discussed. In addition, the present invention does not require the generator to supply a constant power at a constant RPM, but rather a linearly-increasing power at a constant RPM as the vehicle speed is increased. Further savings in fuel result from this feature.

(c) No frequency relationship must be maintained between the RPM of the prime mover-generator combination and the RPM of the AC traction motor. The electrical energy conversion unit of the invention provides isolation by maintaining a variable DC power interface between these two rotating machinery elements of the system.

(d) The need for a bulky, heavy battery system as an alternate source of energy is obviated, since a constant DC voltage source is not required by the invention.

In addition to the operator's speed control, three other manual or pedal controls are also disclosed in this invention:

(i) A forward/reverse switch causes generation of either phase-advanced or phase-retarded AC drive signals for the AC traction motor, resulting in change in rotational direction of the rotor shaft as the switch position is changed. The switch is operative only when the vehicle is not moving;

(ii) A torque-control that increases the available torque at the slower speeds; and (iii) An acceleration control that controls the rate of response to a step change in the speed control.

BRIEF DESCRIPTION OF DRAWINGS

The details of the invention are described in connection with the accompanying drawings in which.

BEST MODE FOR CARRYING OUT THE INVENTION

Figure 1:
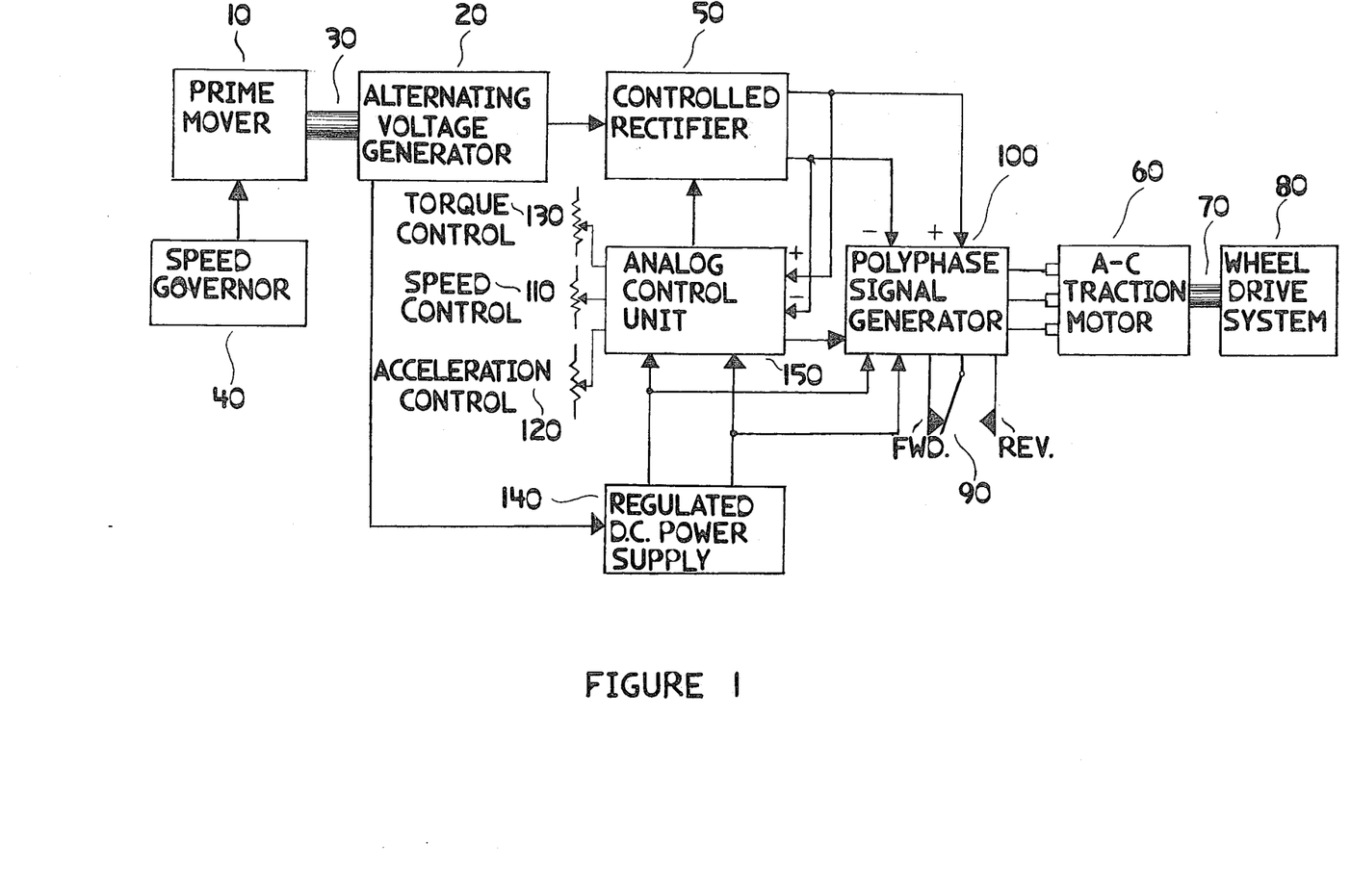
FIG. 1. Is a system block diagram of the preferred embodiment.
Figure 2:
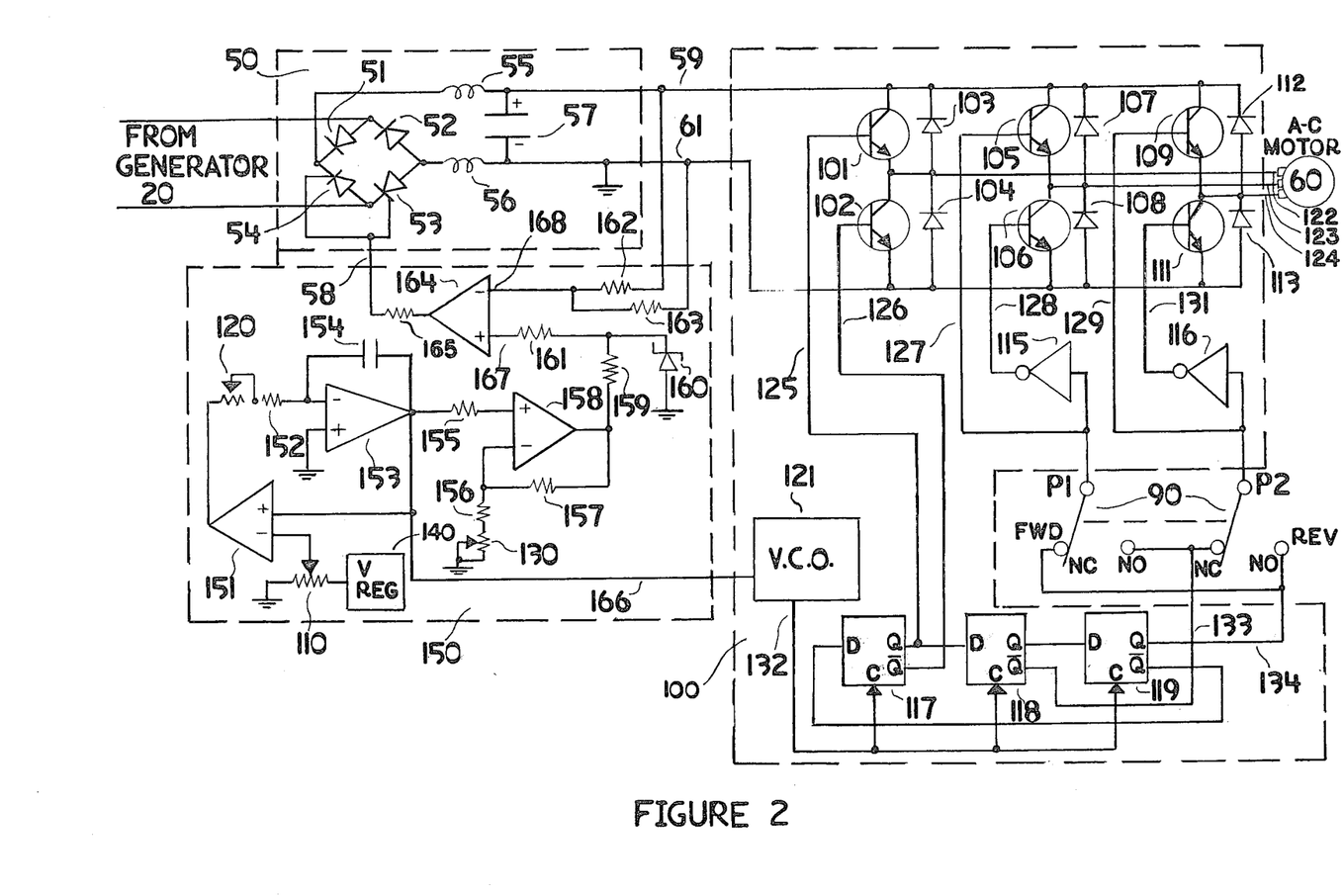
FIG. 2. Is a schematic diagram of the electrical energy conversion unit of the preferred embodiment.
Figure 3:
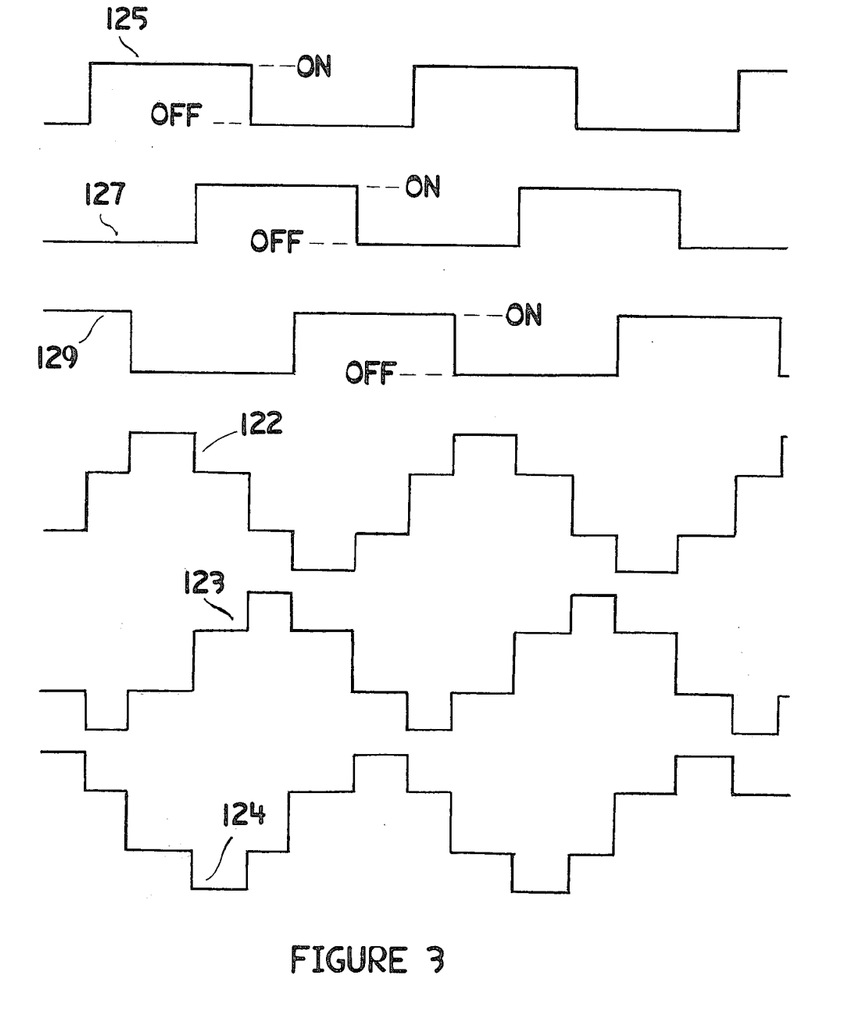
FIG. 3. Is a series of waveforms illustrating the method of generating the polyphase AC motor excitation signals.

The Electro-Mechanical Propulsion System is described with the aid of FIGS. "1" through "3."

FIG. "1" shows an Electro-Mechanical Propulsion System 1 that is composed of 15 major elements: a prime mover 10 which in the best mode of the invention is an internal combustion engine; an alternating voltage generator 20 producing a 60 Hz voltage of 230 VAC; a first rotor shaft 30 coupling the generator and prime mover; a speed governor 40 maintaining the first shaft 30 at a constant 1800 RPM by controlling the fuel mixture of the prime mover 10; a controlled rectifier 50; an AC traction motor 60, which in the best mode of the invention is a 3-phase, 4-pole induction motor capable of operating at excitation signal frequencies ranging from 0 to 60 Hz; a second rotor shaft 70 attached to motor 60; a wheel drive system 80 for coupling the second shaft 70 to one or more vehicle driving wheels; a forward/reverse 2-pole, double-throw switch 90 to control the direction of rotation of the second rotor shaft 70; a polyphase signal generator 100; a speed control potentiometer 110; an acceleration control potentiometer 120; a torque control potentiometer 130; a regulated DC power supply 140; and an analog control unit 150.

The regulated D.C. power supply 140, in the preferred embodiment, receives AC voltage from the alternating voltage generator 20, rectifies this AC voltage and further regulates the rectified AC voltage to provide constant DC voltages for the analog control unit 150 and the polyphase signal generator 100.

The controlled rectifier 50, the polyphase signal generator 100, and the analog control unit 150 comprise an electrical energy conversion unit wherein the constant-voltage, constant-frequency signal from the generator 20 is converted to a variable-voltage, variable-frequency excitation signal for the motor 60.

FIG. "2" is a schematic showing in greater detail the operation of the controlled rectifier 50, polyphase signal generator 100, and analog control unit 150. In addition, the effect and interaction of switch 90 and potentiometers 110, 120, and 130 are illustrated in FIG. "2."

The controlled rectifier comprises a bridge circuit consisting of diodes 51 and 52, and silicon-controlled rectifiers 53 and 54, and a DC smoothing filter consisting of inductors 55 and 56 and capacitor 57. The gate leads of SCRs 53 and 54 are tied together; and the voltage signal 58 applied to these gates controls the forward conduction angle of the SCRs in order to produce a varying DC voltage across capacitor 57. The polarity of the diodes and SCRs are such that the upper bus 59 is always positive with respect to the lower bus 61 at the output of controlled rectifier 50. The control range of the SCR gate voltage 58 is of such magnitude that the voltage across capacitor 57 varies from 0 to 300 VDC as the control voltage 58 is varied from its most negative limit to its most positive limit.

The polyphase signal generator 100 produces three alternating voltage signals 122, 123, and 124, each of which is 120 degrees out of phase with its adjacent signal. A solid state AC inverter circuit, commonly used to convert a DC voltage to three-phase AC voltages is comprised of 3 pair of solid state switches: Pair one consists of NPN transistors 101 and 102; pair two consists of NPN transistors 105 and 106; and pair three consists of NPN transistors 109 and 111.

One of diodes 103, 104, 107, 108, 112, and 113 is connected in parallel across each of the six transistors of the AC inverter to prevent instantaneous buildups of large reactive voltages across the transistor during transient switching periods. Complementary square wave switching signals are provided for each pair of NPN transistor switches at their bases on lines 125, 126, 127, 128, 129 and 131. These signals are derived as follows: A voltage controlled oscillator 121 provides a square wave output 132 whose frequency is proportional to the DC voltage on frequency control line 166 and equal to six times the frequency of the switching square wave signals on the bases of the six AC inverter transistors.

Oscillator output 132 serves as a clock signal for D flip-flops 117, 118, and 119, which are configured as a divide-by-6 counter. Each Q output of the counter switches state one clock pulse later than its preceding flip-flop output and remains at that state for 3 clock pulses. Each Q output, therefore, lags the preceding flip-flop Q output by 60 degrees. Six symmetrical square wave output constituting 6 equally-spaced phases are therefore available from the Q and $\bar{Q}$ outputs of flip-flops 17, 118, and 119. Lines 125 and 126 which are the Q and $\bar{Q}$ outputs from flip-flop 117, provide switching signals for NPN pair 101 and 102.

In order to provide the capability of reversing the rotation of the AC motor, the $\bar{Q}$ output of flip-flop 118 is connected to the normally-open contact of pole 1 and to the normally-closed contact of pole 2 of forward-reverse switch 90. Similarly, the Q output of flip-flop 119 is connected to the normally-closed contact of pole 1 and to the normally-open contact of pole 2 of switch 90. The common signal 127 of switch 90 pole 1 is inverted in logic inverter 115 to produce signal 128. Signals 127 and 128 serve as complementary switching signals for AC inverter NPN pair 105 and 106. Similarly, the common signal 129 of switch 90 pole 2 is logically inverted in inverter 116 to produce signal 131. Signals 129 and 131 serve as complementary switching signals for AC inverter NPN pair 109 and 111.

FIG. "3" illustrates the relationship between polyphase switching signals 125, 127, and 129; and the voltages on AC motor lines 122, 123, and 124. Since only three of the six transistor switches are conducting at any of the six switching periods during a cycle (either 1 upper and 2 lower, or 2 upper and 1 lower), the current drain from upper bus 59 to lower bus 61 through the polyphase switches remains constant throughout the cycle. Furthermore, an approximate sinusoidal waveform is generated at each motor drive input, wherein the peak voltage of each signal is approximately equal to two-thirds of the DC voltage from upper bus 59 to lower bus 61.

The analog control unit 150 operates to control the DC voltage from upper bus 59 to lower bus 61, and also to control the frequency of voltage-controlled oscillator 121 by providing the proper DC voltage on frequency control line 166. Referring again to FIG. "2," potentiometer 110 is manually varied to increase or decrease the frequency of VCO 121 and the RPM of the AC motor. Since the ends of the potentiometer 110 are connected to a regulated voltage from supply 140, the wiper of potentiometer 110 produces a variable DC voltage at the negative input of operational amplifier 151.

A negative feedback signal is provided at the positive input of operational amplifier 151 from the output of amplifier 151 through acceleration control potentiometer 120, resistor 152, and an integrator comprising operational amplifier 153 and capacitor 154. Any change in the speed control voltage at potentiometer 110 wiper is tracked by the positive input of operational amplifier 151 through this feedback path. The tracking rate is controlled by acceleration control potentiometer 120, resistor 152, and capacitor 154. A range of tracking rates is provided by varying potentiometer 120 throughout its full range. At any given position of potentiometer 120, a constant rate of change in voltage is experienced at the positive input of operational amplifier 151, and therefore at the frequency control output 166. This, in turn, produces a constant frequency change per volt at the voltage-controlled oscillator 121.

Signal 166 is also amplified in operational amplifier 158. The gain of amplifier 158 is controlled by resistors 155, 156, and 157 and torque control potentiometer 130. The output of amplifier 158 is coupled to the positive input of operational amplifier 164 through resistors 159 and 161. At the junction of these two resistors, a zener diode 160 limits the maximum positive voltage excursion from amplifier 158. The voltage 167 at the positive input of amplifier 164 is used to control the voltage between upper bus 59 and lower bus 61 by causing a negative feedback signal 168 to be fed back to the negative input of amplifier 164 in the following manner:

If voltage 167 is larger than voltage 168, SCR gate 53 voltage 58 rises due to the gain of amplifier 164 though resistor 165. This, in turn, causes an increase in conduction of SCRs 53 and 54, producing an increase in DC voltage from upper bus 59 to lower bus 61. A voltage divider, consisting of resistors 162 and 163, placed across the controlled rectifier output from upper bus 59 to lower bus 61, produces a proportional voltage increase at resistor 162-163 junction. This junction voltage 168 is connected to the negative input of amplifier 164, and tracks voltage 167. Similarly, if voltage 167 is decreased due to a lowering of the frequency control voltage 166, voltage 168 (and hence the AC motor drive voltages) will also decrease and track voltage 167.

The overall operation of the invention will now be described. Three variable controls are available to the vehicle operator to maintain optimum operation of the vehicle: A speed control potentiometer 110, an acceleration control potentiometer 120, and a torque control potentiometer 130.

In addition, a forward/reverse switch 90 allows reversal of the vehicle movement. The initial start-up may be accomplished under no-load conditions. Various clutch engagement methods available under the present art may be utilized between the AC motor shaft and the drive system to ease any initial heavy surge requirements demanded when the prime mover is started by conventional starting techniques.

The speed control potentiometer is set at the zero voltage (or zero speed) position, initially. Both acceleration control potentiometer 120 and torque control potentiometer 130 are set at nominal settings, unless the vehicle is under an abnormal starting load (such as being parked facing uphill). In such case the torque control setting may be increased.

After clutch engagement (if used), the vehicle is mainly controlled by the speed control potentiometer 110. Torque control potentiometer 130 is used only for minor adjustments as the vehicle load requirements become either excessive or extremely light. In addition to increasing torque under extreme load conditions, torque may also be reduced under cruising conditions to provide essentially an over-drive condition. The acceleration control potentiometer 120 normally needs to be adjusted only if a much faster or slower response is desired when changing the speed control, such as in emergency conditions. At the other extreme, if a uniform velocity is desired, the acceleration control potentiometer 120 may be increased to a high resistive value (slow response).

Figure 4:
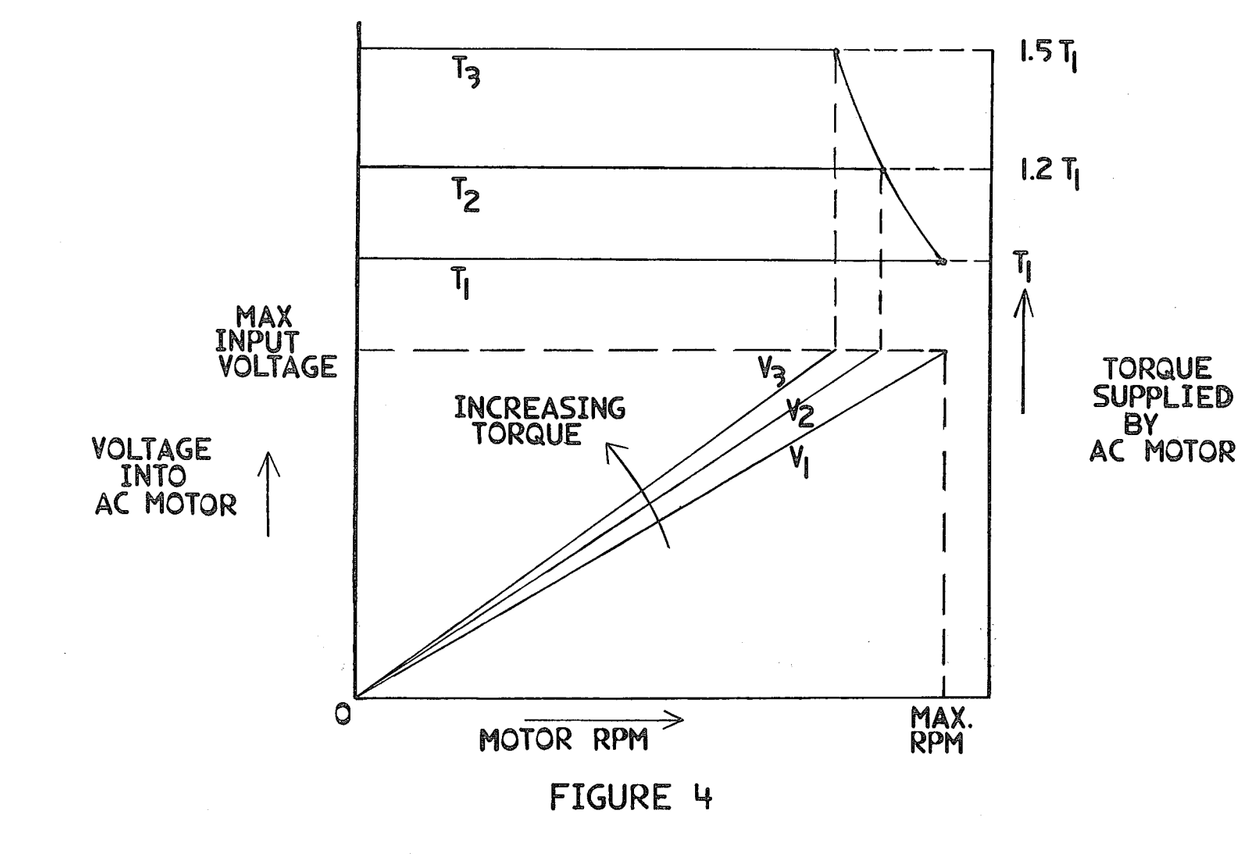
FIG. 4. Is a dual set of performance curves presenting both the applied AC voltage to the polyphase AC motor windings and the developed torque in the motor as a function of motor RPM.

FIG. "4" illustrates the ability of the invention to provide both a constant torque vs. motor RPM as well as capability of producing higher torque at lower speeds. Two sets of curves are plotted in FIG. "4": (a) AC voltage applied to the AC motor vs. motor RPM; and (b) Torque supplied by the AC motor vs. RPM. The horizontal dashed-line represents the maximum AC voltage available to the motor. This limiting voltage is set by zener diode 160 and the ratio of resistor 162 to resistor 163. At the maximum resistance setting of torque control potentiometer 130, the $V_1$ curve will be traced as motor RPM is varied by the speed control potentiometer 110. The torque curve $T_1$ corresponds to this particular setting of potentiometer 130. By reducing the resistance in torque control potentiometer 130, successively higher values of torque are available. The range of torque control provided by potentiometer 130 is limited to the allowable input power to the AC motor.

Figure 5:
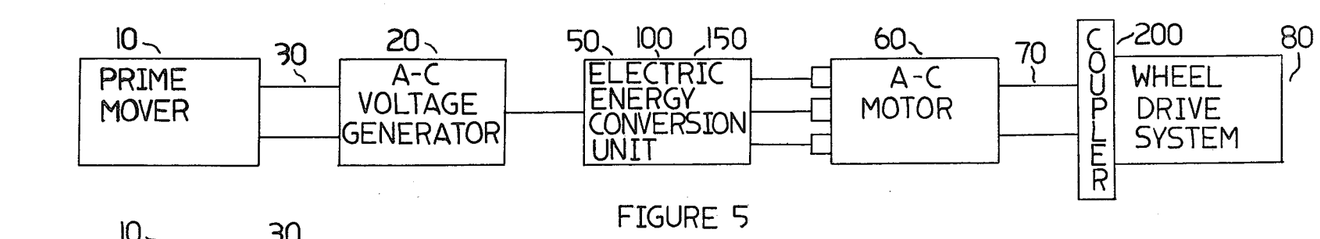
FIG. 5. Is a modification of the preferred embodiment, illustrating an operator-controlled variable coupling to the wheel drive system.
Figure 6:
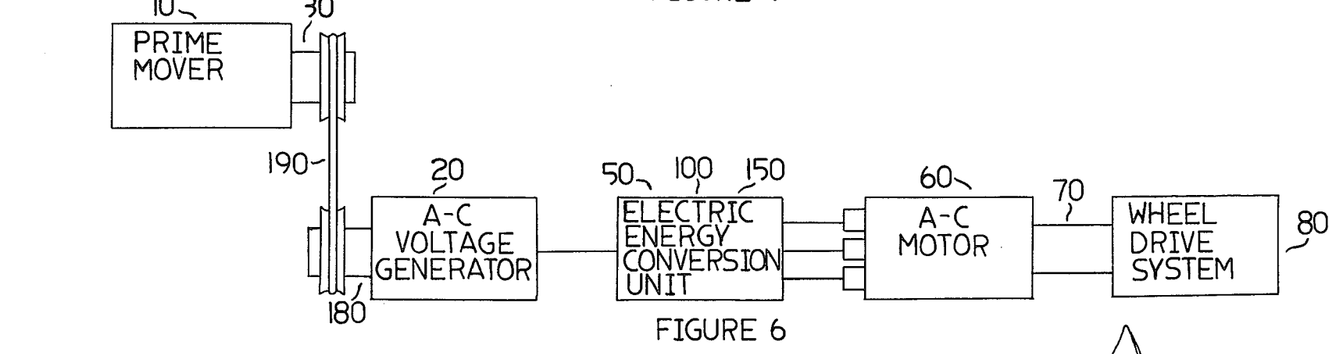
FIG. 6. Is a modification of the preferred embodiment, illustrating a pulley system coupling the prime mover to the alternating voltage generator.
Figure 7:
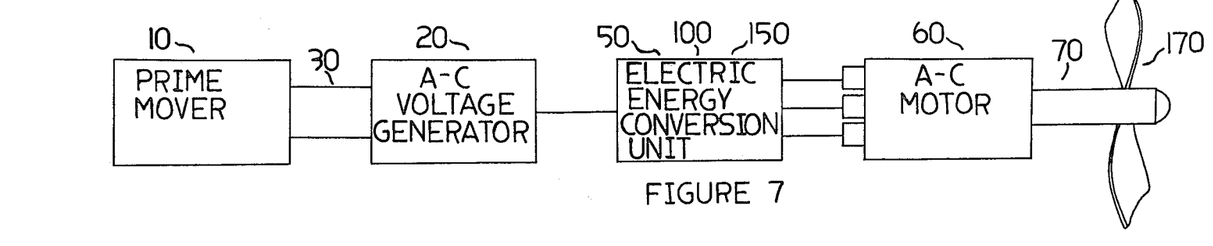
FIG. 7. Is a modification of the preferred embodiment, illustrating the substitution of a shaft-driven propellor for the wheel drive system.

It should be apparent that refinements in the present invention may be desirable under varying load demands and requirements. No restriction need be placed on either the RPM of the prime mover-generator combination or the frequency range of the AC motor 60. By using an optimized gear ratio in the drive system, lighter and higher RPM motors may be employed other than herein selected as the best mode of the invention. FIG. 5 is a modification of the preferred embodiment illustrating the addition of a coupling mechanism 200 between the second rotor shaft 20 and the vehicle wheel drive system 80. This coupler 200 typically may comprise a clutch/transmission system under operator control to allow the propulsion system to adapt to varying load demands. FIG. 6 illustrates yet another modification of the preferred embodiment where a pulley belt 190 is used to couple the first shaft 30 driven by the prime mover 10 to a third shaft 180 that drives the alternating voltage generator 20. Such a modification may be desirable when prime mover 20 and alternating voltage generator 20 RPM requirements differ. It should also be apparent that the applications of the present invention are not limited to traction wheel drive systems. The invention will be equally effective in operating shaft-driven propellor systems such as those used in water. FIG. 7 illustrates a modification of the preferred embodiment where a propellor 170 driven by the second rotor shaft 70 has replaced the wheel drive system 80.

We claim:
1. An Electro-Mechanical Propulsion Systems for a vehicle having a motive drive system, comprising:
 (a) A prime mover having a first rotor shaft;
 (b) An alternating voltage generator having a rotor and a stator;
 (c) Means for coupling the prime mover first rotor shaft to the alternating voltage generator;
 (d) A controlled rectifier, adaptable to accept the generator alternating voltage and a DC control voltage, wherein the generator alternating voltage is converted to a variable DC voltage that is proportional to the applied DC control voltage, the variable DC voltage appearing between an upper bus and a lower bus wherein the upper bus is always positive with respect to the lower bus;
 (e) An AC motor having a second rotor shaft and multiple input terminals for accepting motor drive signals of identical frequency and differing electrical phase, and whose second rotor shaft rotational rate is a function of the frequency of the AC motor drive signals;
 (f) Means for coupling the second rotor shaft to the vehicle motive drive system;
 (g) A manually-operable switch to control the direction of rotation of the second rotor, adapted to produce a forward/reverse voltage;
 (h) Means for producing a speed control voltage for controlling the frequency and voltage of the motor drive signals;
 (i) Means for producing a torque control voltage for controlling the torque supplied to the AC motor;

(j) Means for producing an acceleration control voltage for controlling the acceleration rate of the AC motor in response to a step change in the speed control voltage;

(k) An analog control unit, operable to accept the speed control voltage, the torque control voltage, the acceleration control voltage, and the variable DC voltage generated by the controlled rectifier, wherein is generated a DC control voltage to be applied to the controlled rectifier that is a function of the speed control voltage, the torque control voltage and the variable DC voltage, and whose response rate is proportional to the acceleration control voltage, and wherein is also generated a frequency control voltage that is a function of the speed control voltage and whose response rate is proportional to the acceleration control voltage;

(l) A polyphase AC signal generator, operable to accept the frequency control voltage, the forward/reverse voltage, and the variable DC voltage between upper bus and lower bus, wherein the variable DC voltage is converted to a plurality of AC motor drive signals whose frequency is proportional to the frequency control voltage, and the electrical phase difference between any adjacent motor drive signals is equal to 360 degrees divided by the number of motor drive signals, and the forward/reverse voltage is operable to change the phase relationship between adjacent motor drive signals to thereby reverse the rotation of the motor rotor; and (m) Means for generating a regulated voltage supply for the analog control unit and polyphase AC signal generator.

2. The System as specified in claim 1, wherein the prime mover is an internal combustion engine.

3. The System as specified in claim 1, wherein the motive drive system has at least one driving wheel.

4. The System as specified in claim 1, wherein the motive drive system has a propeller as the driving element.

5. The System as specified in claim 1, further comprising means for maintaining the first rotor shaft at a constant rotational rate.

6. The System as specified in claim 1, wherein the AC motor is a 3-phase AC induction motor.

7. The System as specified in claim 1, wherein the means for producing a speed control voltage is a first manually-operable potentiometer connected to the direct current power supply.

8. The System as specified in claim 1, wherein the means for producing a torque control voltage is a second manually-operable potentiometer connected to the direct current power supply.

9. The System as specified in claim 1, wherein the means for producing an acceleration control voltage is a third manually-operable potentiometer connected to the direct current power supply.

10. The System as specified in claim 1, wherein the means for generating a regulated voltage supply for the analog control unit and polyphase A.C. signal generator comprises an alternating current rectifier connected to the alternating voltage generator, and a D.C. voltage regulator connected to the output of the alternating current rectifier.

11. The System as specified in claim 1, wherein the means for coupling the second rotor shaft to the vehicle motive drive system provides for operator control of the amount of coupling.

12. The System as specified in claim 1, further comprising means for maintaining the generator voltage constant.

13. The System as specified in claim 1, wherein the alternating voltage generator rotor is integrally attached to the prime mover first rotor shaft, thereby being the means for coupling the prime mover first rotor shaft to the alternating voltage generator.

14. The System as specified in claim 1, wherein the alternating voltage generator has a third rotor shaft, and wherein the means for coupling the prime mover first rotor shaft to the alternating voltage generator is a pulley belt that rotates the third rotor shaft in unison with the first rotor shaft.

* * * * *